United States Patent [19]
Shyr et al.

[11] Patent Number: 5,743,375
[45] Date of Patent: Apr. 28, 1998

[54] CONVEYER TRANSFER APPARATUS

[75] Inventors: Duen-Jyh Shyr, Fu Chain; Kuan-Chou Chen, Shing Ying, both of Taiwan

[73] Assignee: Industrial Technology Research Institute

[21] Appl. No.: 526,614

[22] Filed: Sep. 11, 1995

[51] Int. Cl.$^6$ .................................................. B65B 37/00
[52] U.S. Cl. ........................... 198/463.3; 198/370.1; 198/809
[58] Field of Search ........................... 198/370.1, 809, 198/463.3, 779

[56]  References Cited

U.S. PATENT DOCUMENTS

| | | | |
|---|---|---|---|
| 3,756,374 | 9/1973 | Burt et al. ................................ | 198/809 |
| 4,664,253 | 5/1987 | Fahrion ................................ | 198/463.3 |
| 4,730,718 | 3/1988 | Fazio et al. ................................ | 198/370.1 |
| 4,732,265 | 3/1988 | vom Stein ................................ | 198/809 |
| 4,798,275 | 1/1989 | Leemkuil et al. ................................ | 198/370.1 |
| 4,962,841 | 10/1990 | Kloosterhouse ................................ | 198/809 |
| 5,104,281 | 4/1992 | Corvi ................................ | 198/809 |

*Primary Examiner*—Karen B. Merritt
*Assistant Examiner*—Douglas Hess
*Attorney, Agent, or Firm*—W. Wayne Liauh

[57]  ABSTRACT

A conveyer transfer apparatus for use in a roller conveyer for lifting an article upwardly and moving it laterally to another conveyer. It includes a motor as a driving force to drive two pairs of spaced eccentric sprockets and a side-roller-chain, which engages with a pair of spaced sprockets. The side-roller-chain moves on a guide channel, which can be lifted upward, synchronously with the movement of the sprocket, thus enabling the article to be lifted upward and carried away laterally at a speed faster than the rotating speed of the sprocket.

5 Claims, 10 Drawing Sheets

5,743,375

CONVEYER TRANSFER APPARATUS

BACKGROUND OF THE INVENTION

1. Field of the Invention

The invention relates to a conveyer transfer apparatus and more particularly to a transfer apparatus for a roller conveyer to enable an article, upon being carried to a diversion or convergent location, to be lifted upward and to be quickly transferred horizontally.

2. Description of the Prior Art

The vertical transfer facility used in a conventional roller conveyer is mainly to change the movement direction of an article from the roller conveyer, i.e. vertical transfer, so that the article can be diverted or converged. During a diversion process, when an article being carried to the transfer location, the transfer mechanism must lift the article above the rollers and transfer it to another conveyer. In the convergent process, when an article arrives at the transfer mechanism, the transfer mechanism must lift the article and then move it to another conveyer and lower the article onto another conveyer for it moving in a new direction. Thus a conventional vertical transfer facility has two motions during the transfer operation, one is to lift or lower the article, another is to move the article laterally. The two motions need two different driving sources. The lifting or lowering is accomplished by an air cylinder and linkage or a guide rail. The lateral movement is carried out by a motor and another set of rollers. This type of conveyor is complex and costly. The two different driving forces also become a burden in investment and maintenance.

SUMMARY OF THE INVENTION

The object of this invention is to provide a conveyer transfer apparatus which employs only one driving source for carrying out both the lifting and lateral movement function in a transfer operation, for allowing the articles on the conveyer to be diverted into to different directions. This type of structure is, easy to produce, assemble and control, having small size and low cost. It can be readily adapted to the existing conveyer system. It also takes less space under the conveyer, thus can reduce the overall height of the conveyer system. It provides more practical and economic value than a conventional conveyer transfer facility.

The transfer apparatus of this invention has two side-roller chains disposed on two lateral ends of a plural number of conveyer rollers. The chain rollers are rolling on a set of guide channels. The side-roller-chain engages with a pair of eccentric sprockets which have the same eccentric phase. A pair of sprockets are mounted on a spindle. A motor drives another sprocket which is chained with one of the eccentric sprockets, thus rotating both spindles. The guide channel is resting on a pair of bearings which are eccentrically mounted on the spindle beside the eccentric sprockets.

The two guide channels are connected so that they can be lifted or lowered synchronously with the bearings by the rotation of the sprockets.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
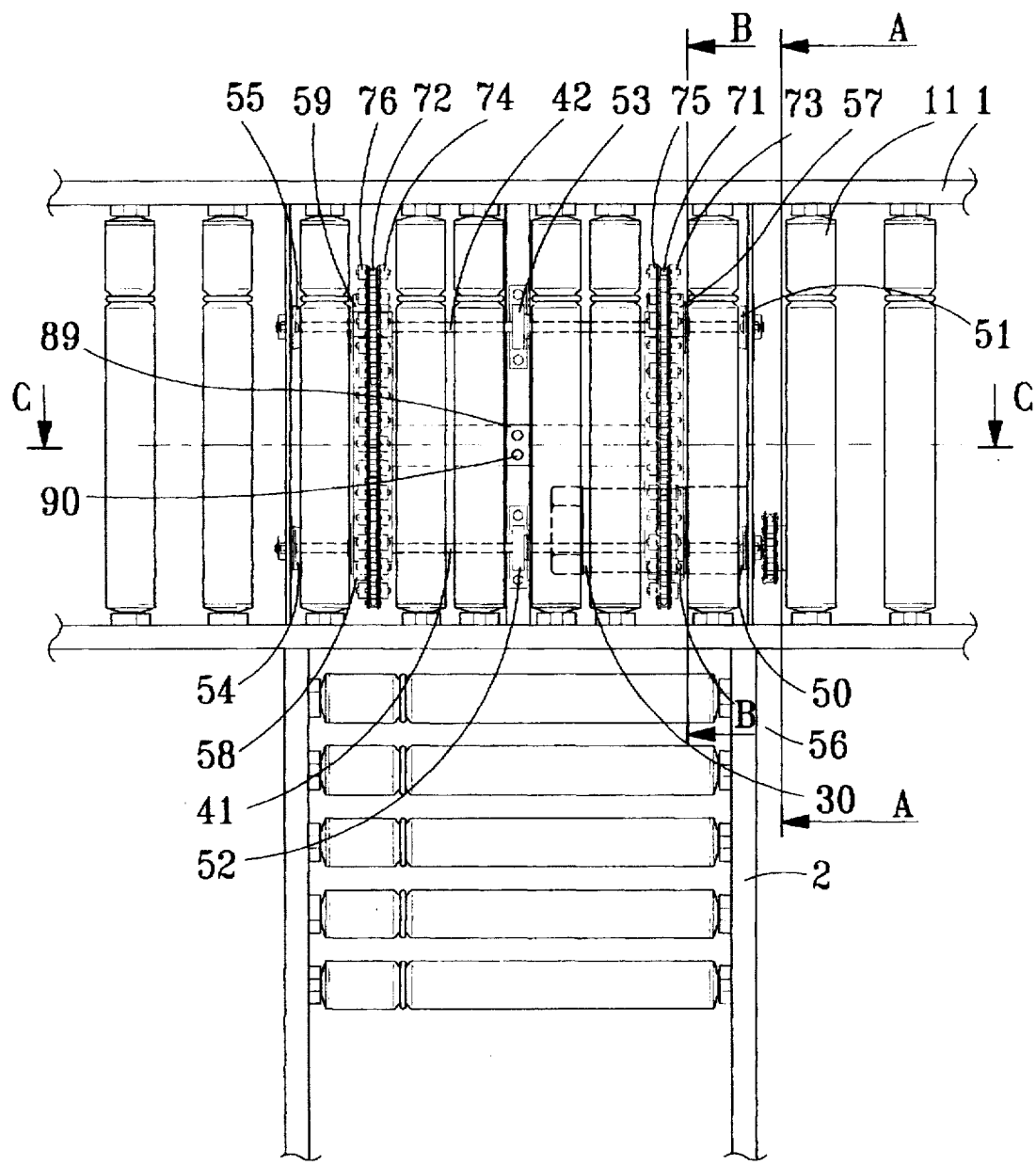
FIG. 1 is a view of the invention
Figure 2:
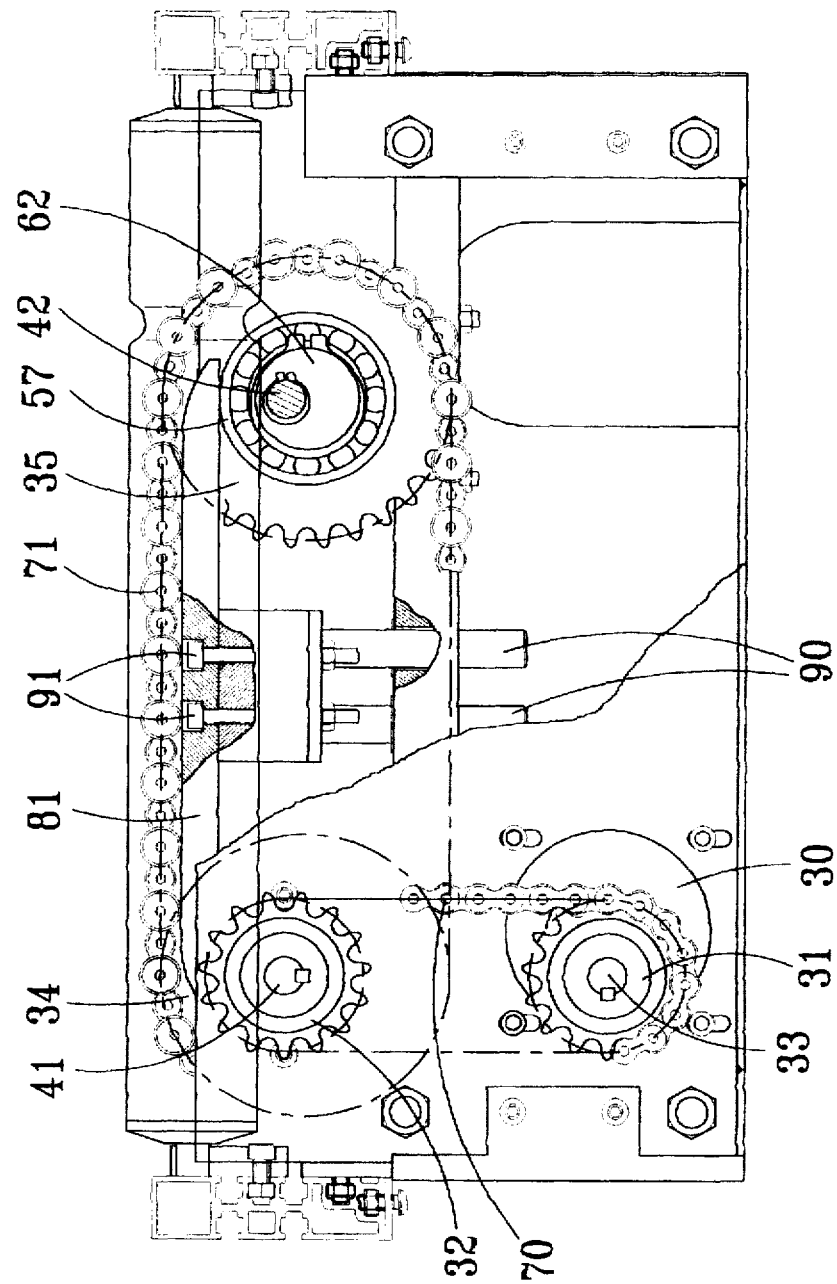
FIG. 2 is a side view from line A—A of FIG. 1
Figure 3:
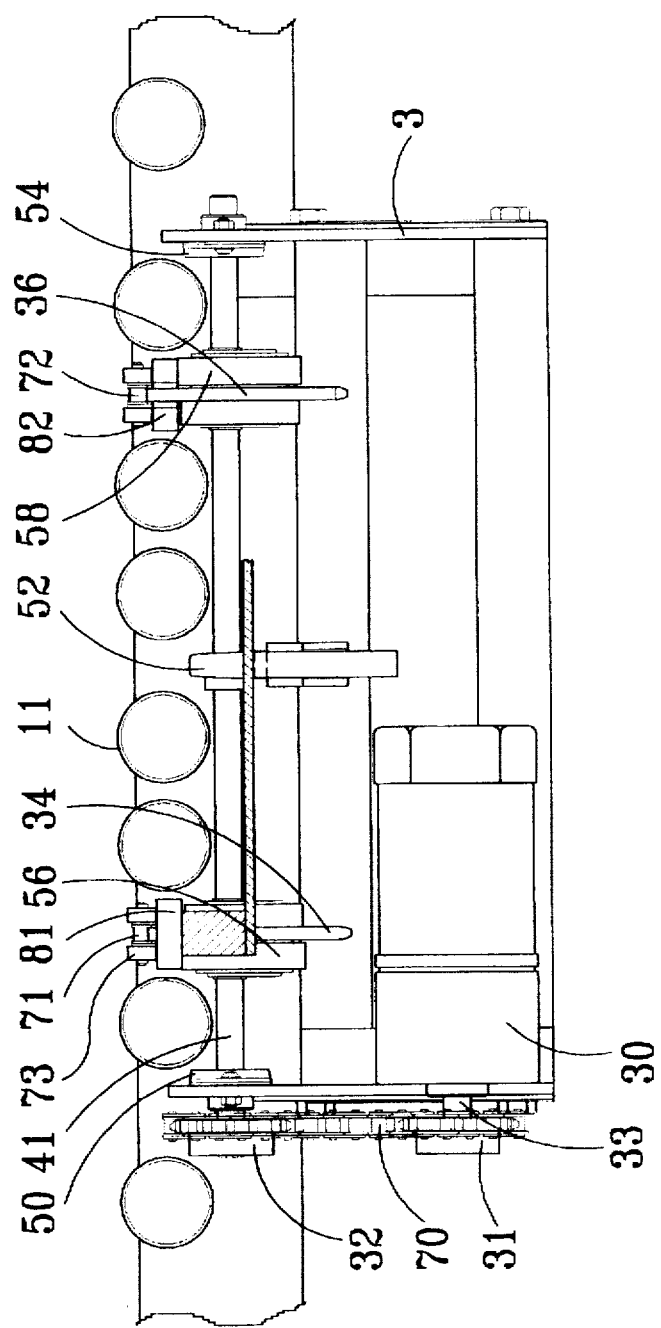
FIG. 3 is a side view from line C—C of FIG. 1

Referring to FIG. 1, the conveyer transfer apparatus is installed below the conveyer (also refer to FIG. 6) for transferring an article 9 from the main conveyer 1 to a secondary conveyer 2 for diversion purposes. It can also allow an article 9 to be transferred from the secondary conveyer 2 to the main conveyer 1 for convergence purposes. It can also be used to redirect an article, such as a 90 degree transfer.

Figure 7:
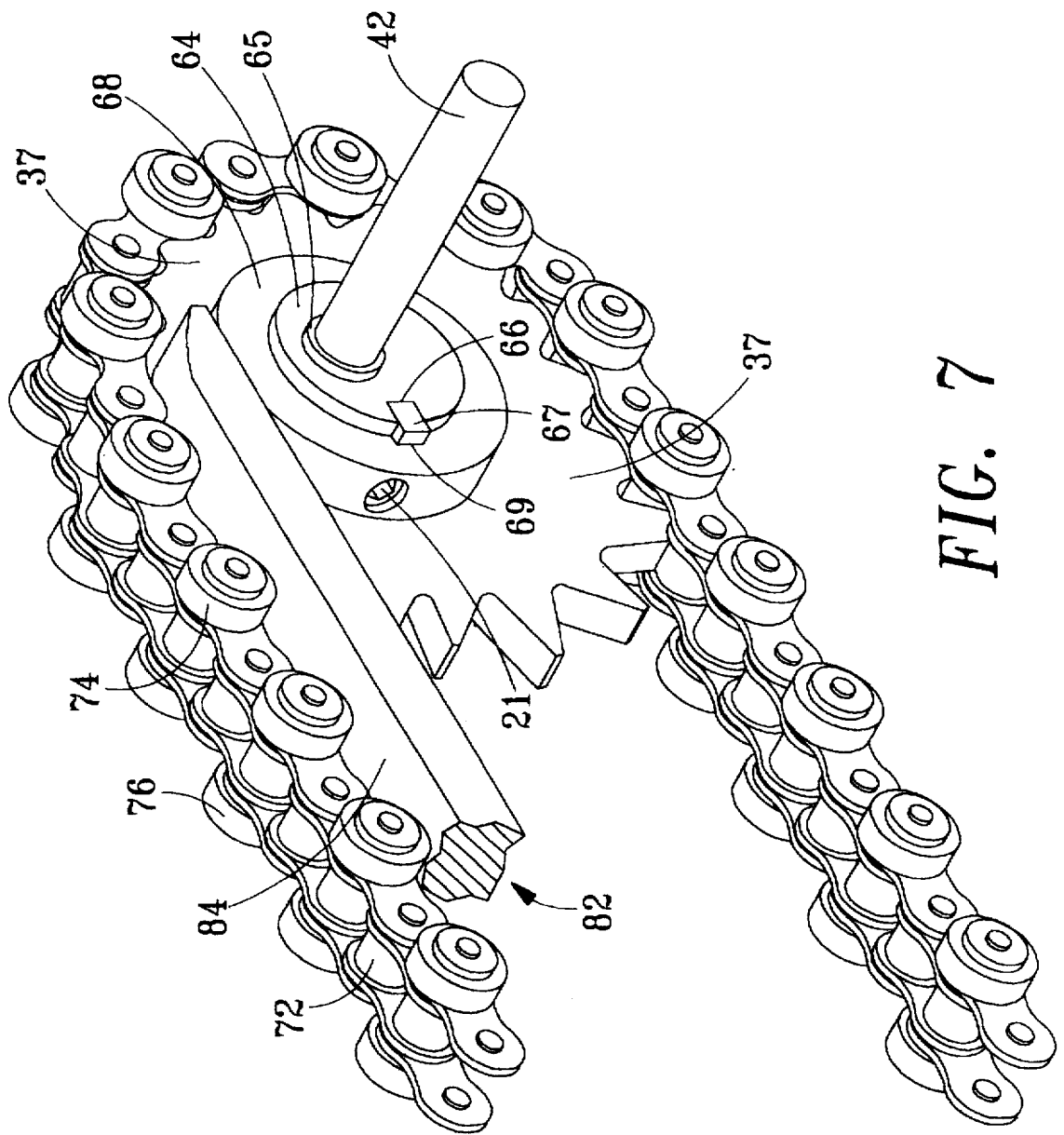
FIG. 7 is fragmentary perspective view of the sprockets of the invention

Referring to FIG. 1 through 5, the invention includes a motor 30 mounted on a base 3. The spindle 33 of motor 30 engages a transmission sprockets 31 which further engages a driven sprockets 32 through a chain 70. Driven sprockets 32 are mounted on a spindle 41 which is perpendicular to the axial direction of roller 11. Another spaced spindle 42 is parallel with spindle 41. The spindles 41 and 42 are respectively housed at both ends in a pair of bearings 50 and 54, 51 and 55 which are mounted in the base 3. The spindles 41 and 42 are also mounted respectively on a pair of bearing seats 52 and 53 located in the center and mounted on the base 3. The spindles 41 and 42 further have a pair of eccentric sleeves 61 and 63, 62 and 64 dispersed respectively at both ends. Also refer to FIG. 7, the eccentric sleeve 64 is fixed on spindle 42 by a C-shape snap ring 65 along a parallel key. On the peripheral of the sleeve 64, there is a key way 66 and a key 67 disposed therein. Key 67 has a protrusion 68 engaging with a key way 68 which is formed in the flange 68 of the sprockets. Flange 68 is firmly engaged with sleeve 64 by means of a set screw 2. Similar fixing and setting applies to sleeves 61,63 and 62.

Figure 8:
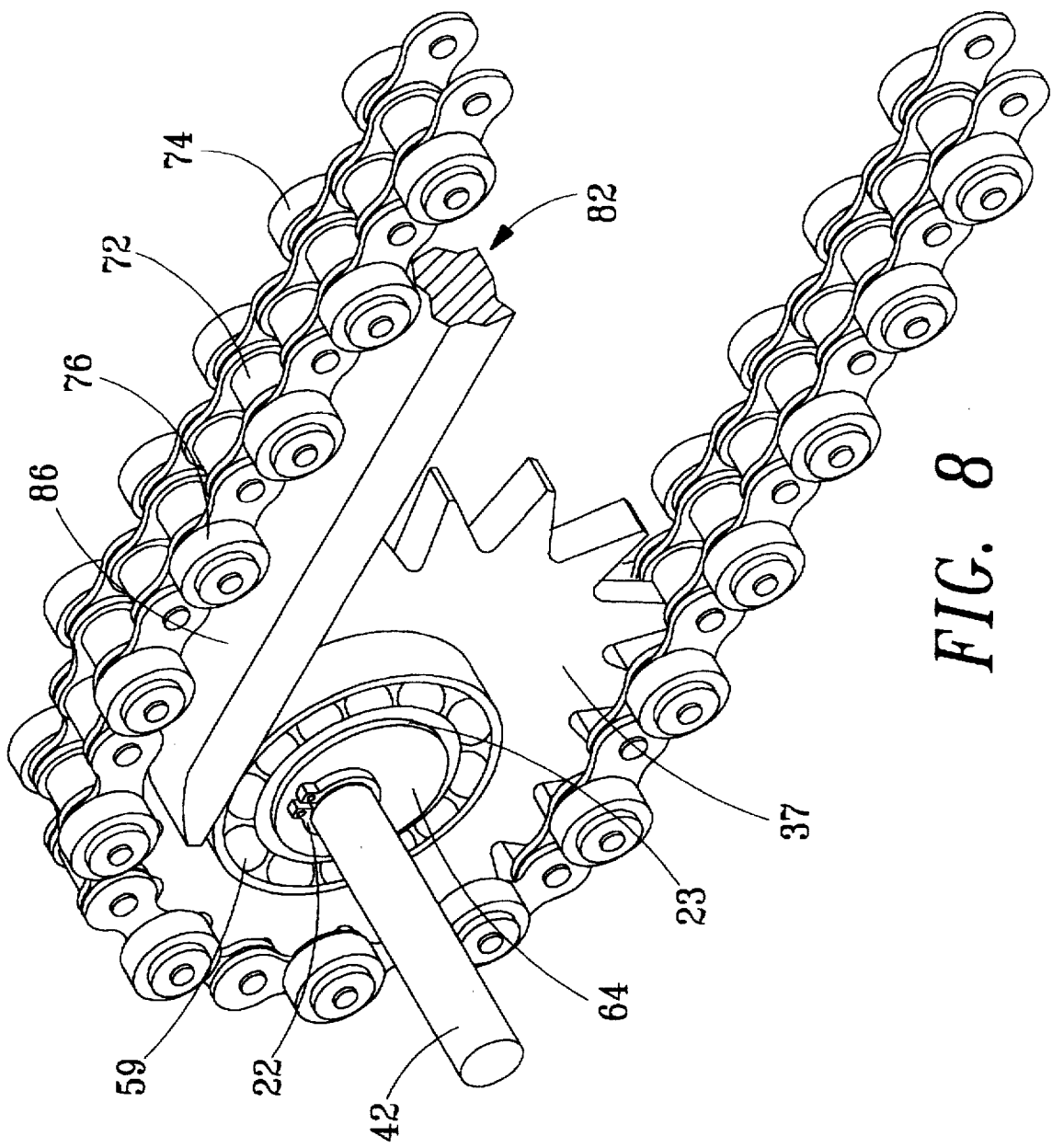
FIG. 8 is another fragmentary perspective view of the sprockets of the invention
Figure 9:
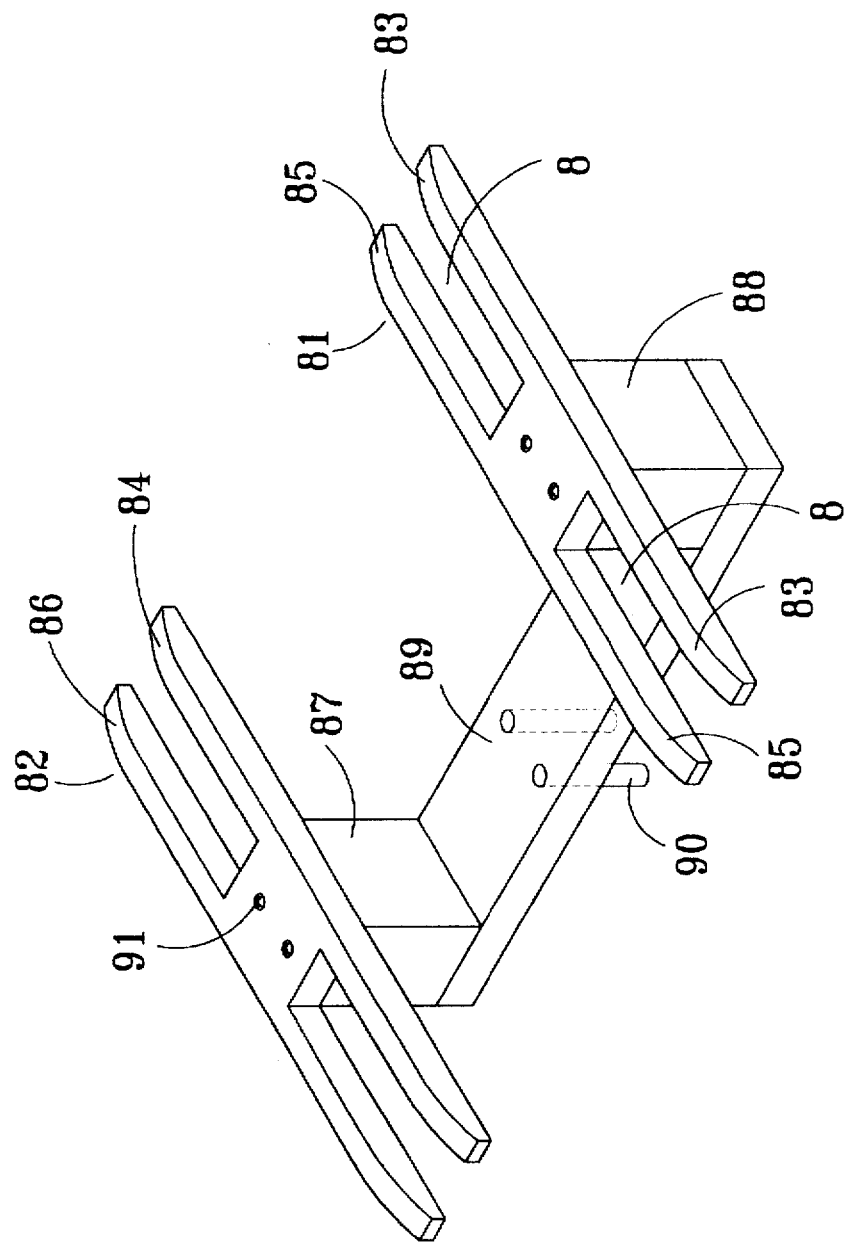
FIG. 9 is a perspective view of a pair of guide channel.

Referring to FIG. 8, on another side of the eccentric sleeve 64, there is a C-shape snap ring 22 engaging spindle 42. Sleeve 64 is housed in a bearing 59 which is held in position by a C-shaped snap ring 23 which also separates the bearing 59 and the sprockets 37. Thus on the sleeves 61, 62, 63 and 64, there is respectively mounted a bearing 56, 57, 58 and 59, and sprockets 34, 35, 36 and 37. Between the sprockets 34 and 36, there is a side-roller-chain 71 wound around them. The same setup is applied to sprockets 35 and 37 with side-roller-chain 72. There are chain rollers 73, 75 and 74, 76 disposed respectively on both ends of alternate pitches of chains 71 and 72. The rollers 73, 75 and 74, 76 can stably move on the surface of guide rails 83, 85 and 84, 86 of guide channels 81 and 82, thereby when chain 71 is moved on the surface of guide channel 81, the tangent speed of roller 73 and 75 will be a speed twice of the speed of chain 71. Therefore article 9 will be carried by chain 71, 72 and can also be moved at twice of the speed of chain 71.

Figure 4:
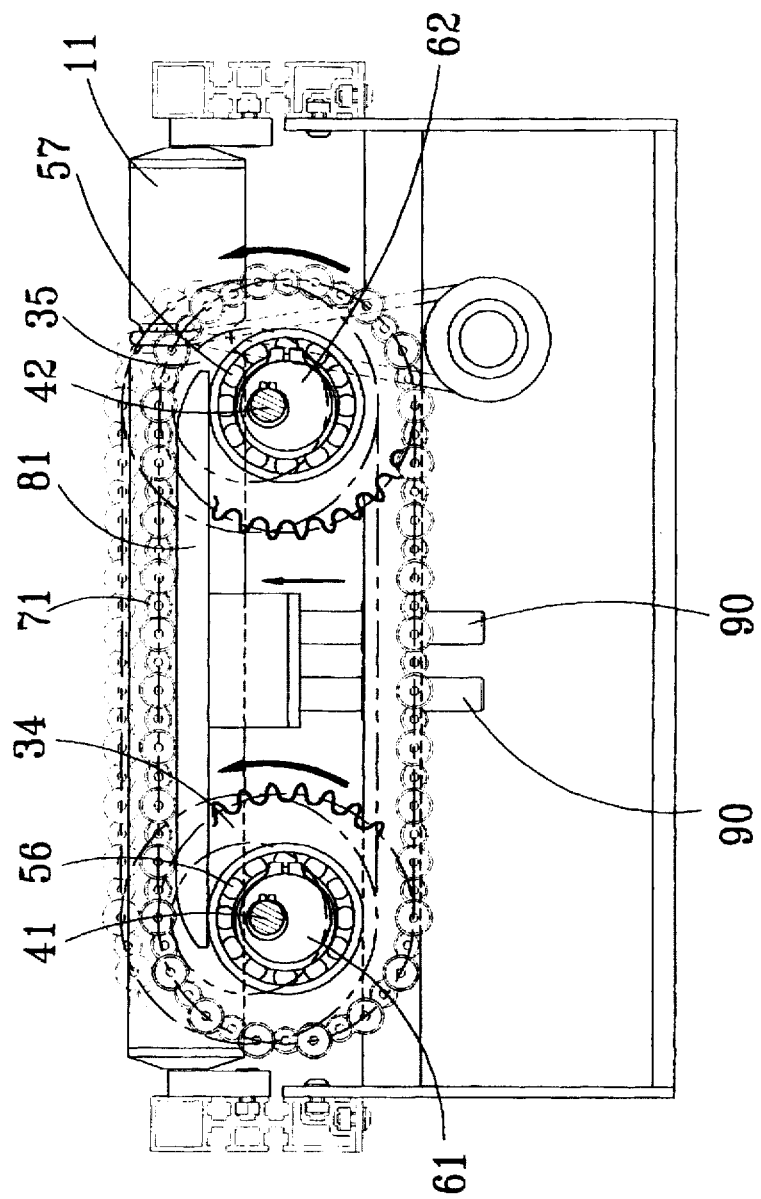
FIG. 4 is a side view from line B—B of FIG. 1
Figure 5:
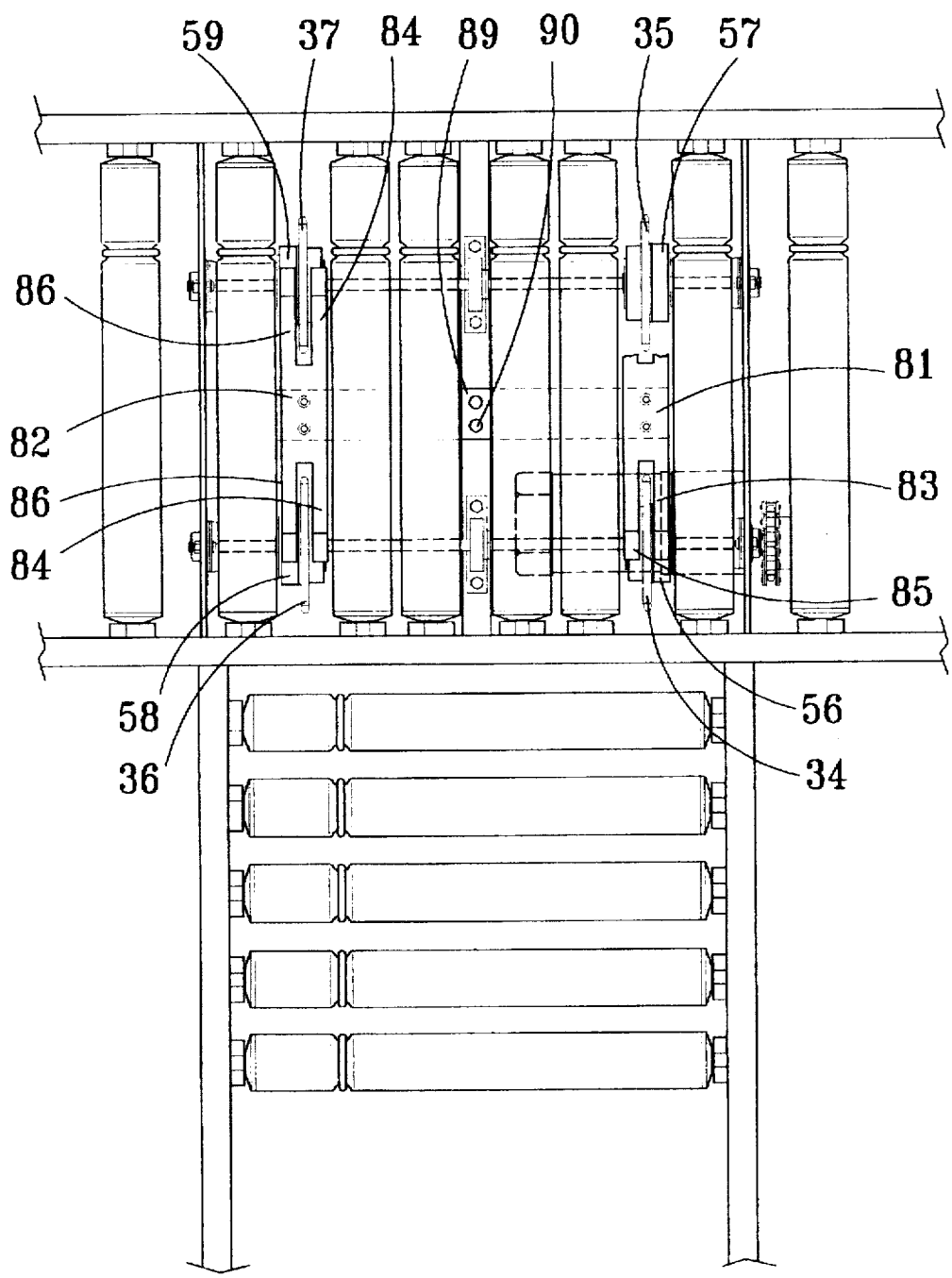
FIG. 5 is a top view of the invention with the side roller-chain removed.
Figure 10:
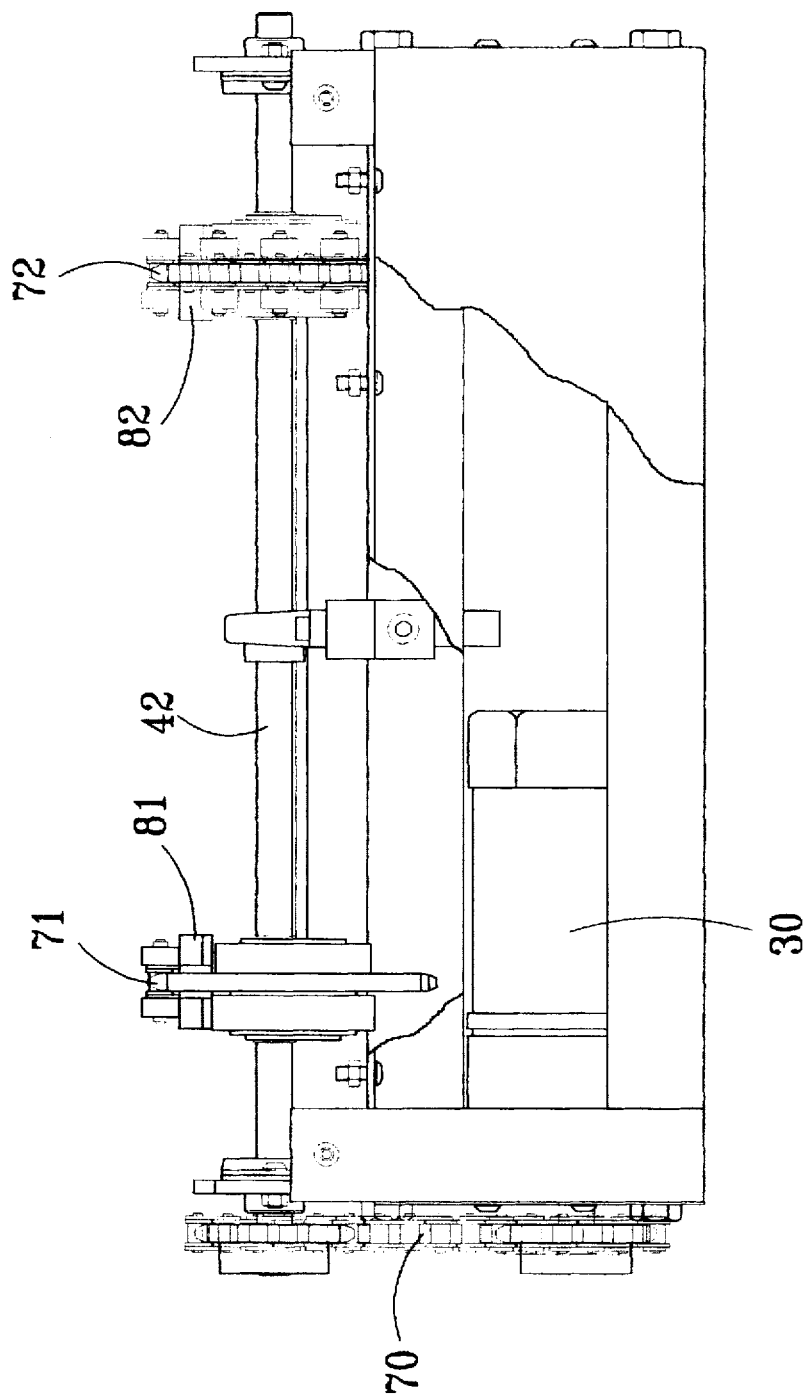
FIG. 10 illustrates a sprocket chain being lifted above the conveyer roller

Referring to FIG. 4, sprockets 34, 35 are mounted respectively on eccentric sleeves 61 and 62, side-roller chain 71 will also be alternately rotated, thus the top surface of chain 71 will be moved alternately from below to above the top surface of conveyer roller 11 (also refer to FIG. 10) thereby creating a lifting function. Multiplier speed chain 72 moves synchronously with chain 71, thereby carrying article 9 to the desired transfer location. FIG. 4 shows eccentric sleeves 61, 62 engaging with bearings 56, 57. The H-shape guide channel 81 is rested on bearings 56, 57. The H-shape guide channel 81 is also rested on bearings 58, 59 Referring to FIG. 5, guide channels 81 and 82 have connection bricks 87, 88 extending downward in the middle portion and then are connected by a bridge 89. Guide channels 81, 82 are formed in a "H" shape, each in turn has guide rails 83, 85 and 84, 86 formed thereon. The slot 8 formed between the guide rails 83, 85 and 84, 86 allow the sprockets to pass through.

When sprockets carry the side-roller chain moving, the rollers of the side-roller chain are rolling on the guide rail, the outside guide rails are resting on the bearings. A pair of guide channels 81 and 82 are thus carried by four bearings 56, 57, 58 and 59, and are synchronously moved or lifted with sprockets. There is a guiding rod 90 disposed under the bridge plank 89 for preventing the guide channels 81 and 82 from moving sideways or swinging.

Figure 6:
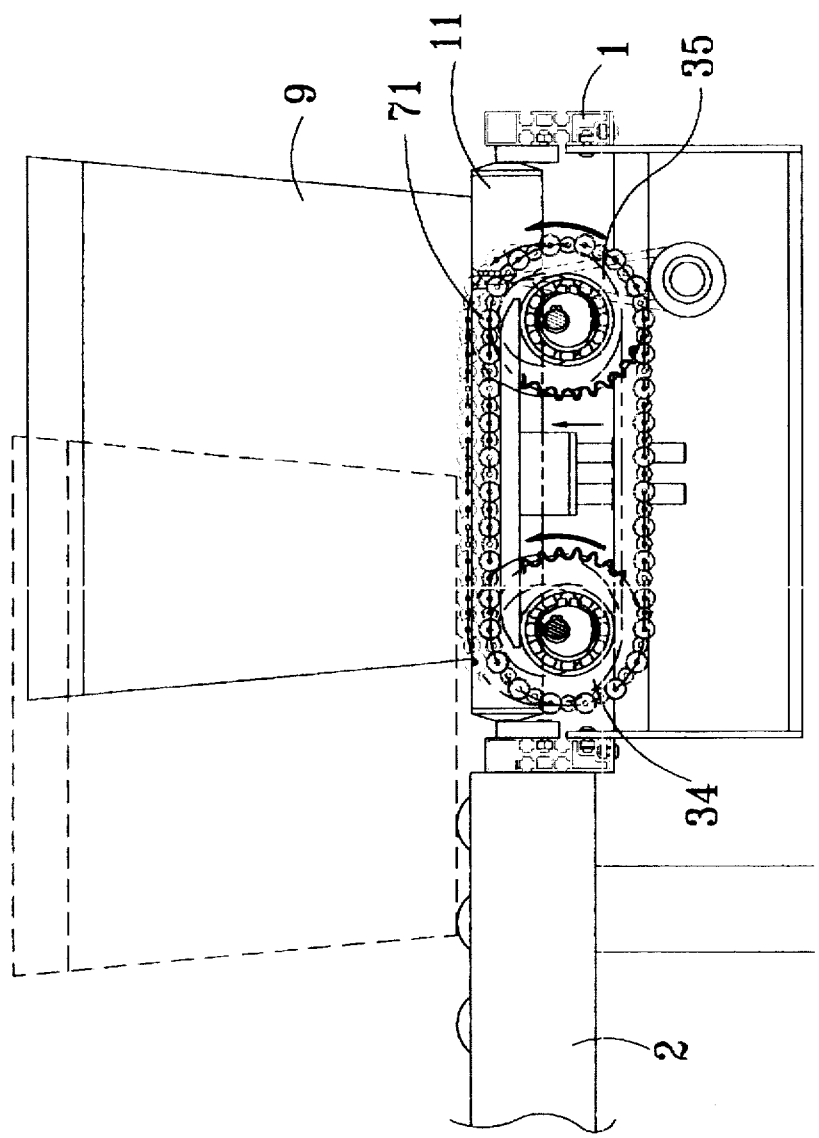
FIG. 6 illustrates the lifting transfer of the invention

Referring to FIG. 6, when an article 9 being moved from main conveyer 1 to secondary conveyer 2, article 9 is first carried above the transfer apparatus of the invention, then is stopped by a stopper of the conveyer or by the stopping of the rollers. Motor 30 is then activated and drives sprockets 34, 35, 36 and 37 and side-roller-chain 71, 72 which are lifted by eccentric sleeves 61, 62, 63 and 64. When chains 71 and 72 are moved above rollers 11, article 9 is lifted and carried in a tangential direction at twice the speed of the chains to secondary conveyer 2. Article 9 is on conveyer 2 and is out of the transfer apparatus before the chains 71 and 72 are moved downward and below the rollers 11 top surface. Motor 30 is stopped when chains 71, 72 and sprockets 34, 35, 36 and 37 are moved to the initial position, thus completing a transfer cycle. When motor 30 is activated in an opposite direction, the sprockets will be moved in reverse, thus article 9 can be lifted and moved from secondary conveyer 2 to main conveyer 1 and proceed to a convergence process.

When the transfer apparatus is inoperative, the side-roller-chain moves lower than the top surface of the conveyer roller, thus forming no interference with the conveyer operation. Motor 30 can rotate reversibly, therefore can perform either diversion or convergence functions. The side-roller-chain may be modified in various ways to suit the transfer requirement, such as to have a different number of chains and/or to increase or decrease the pitch of the chain. The roller size of the side-roller chain may also be changed to improve transfer speed three or four times without changing the dimension of the sprockets. In summary, the invention has the following advantages:

1. Only one driving source is needed to provide both lifting and lateral movement for a transfer apparatus.

2. Through employment of a side-roller chain, small size sprockets can be used to carry relatively long transfer distances.

3. Guide channels and sprockets are supported by the same bearing, allowing guide channels and sprockets to be moved synchronously. The chain is moved horizontally on the surface of the guide rail, thus minimizing friction and wearing of the guide channel and sprocket.

It is a simple structure containing a small number of parts and can be easily adapted to an existing conveyer system or to a new system. It is installed below the conveyer for saving space. It is therefore a low cost, simple, economic, and practical transfer solution to a conveyer system.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A conveyer transfer apparatus for providing diversion or convergence function in a roller conveyer, the apparatus comprising:

a base;

a reversible motor located on the base;

a pair of side-roller-chains, located between a plurality of conveyer rollers, each side-roller-chain having a chain pitch with two sides and a pair of chain rollers disposed respectively at both sides of said chain pitch;

a pair of spindles disposed perpendicularly to said conveyer rollers, each spindle being supported by bearings at both ends and a middle portion thereof which are engaged with said base, one end of one of said spindles having a driven sprocket mounted thereon;

four eccentric sleeves disposed respectively near both ends of said pair of spindles;

four sprockets housed in said four eccentric sleeves, respectively, wherein said four sprockets are grouped into two pairs and each pair of sprockets are mounted on each of said pair of spindles and are engaged with each of said side-roller-chains;

four bearings, each being mounted respectively on an outside end of each of said eccentric sleeves: and a pair of guide channels each being formed into an H-shape, each guide channel including an inside guide rail, an outside rail and a central slot between them to allow said sprocket to travel therewithin, said guide channels are structured such that when said side-roller-chain moves on a surface of the guide channel, said outside guide rail is in contact with said bearing while said inside guide rail hangs on said sprocket so that said guide channels are moved and lifted with said sprocket synchronously;

whereby when an article on the conveyer is being carried above the side-roller-chain, the article is lifted upward and moved laterally to a secondary conveyer by a cam action of said spindles, which are offset in the sleeves.

2. A conveyer transfer apparatus of claim 1, which further comprises a bridge plank for connecting said pair of guide channels with a pair of guide rods provided under the bridge plank so as to prevent said guide channels from moving sideward or swinging.

3. A conveyer transfer apparatus of claim 1, which comprises more than one pair of said side-roller-chains.

4. A conveyer transfer apparatus of claim 1, wherein said chain pitch is adjustable.

5. A conveyer transfer apparatus of claim 1, said whereby side-roller-chain has a changeable roller size for improved transfer speed.

* * * * *